US011233357B2

(12) United States Patent
Lo

(10) Patent No.: US 11,233,357 B2
(45) Date of Patent: Jan. 25, 2022

(54) ADAPTER ASSEMBLY

(71) Applicant: Delta Electronics, Inc., Taoyuan (TW)

(72) Inventor: Tzu-Hao Lo, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/855,884

(22) Filed: Apr. 22, 2020

(65) Prior Publication Data
US 2021/0143576 A1 May 13, 2021

(30) Foreign Application Priority Data

Nov. 7, 2019 (CN) .......................... 201911083272.1

(51) Int. Cl.
H01R 13/62 (2006.01)
H01R 13/627 (2006.01)
B60L 53/16 (2019.01)
H01R 13/52 (2006.01)
H01R 13/53 (2006.01)
H01R 13/625 (2006.01)
H01R 13/633 (2006.01)
H01R 13/639 (2006.01)

(52) U.S. Cl.
CPC .......... H01R 13/6272 (2013.01); B60L 53/16 (2019.02); H01R 13/5219 (2013.01); H01R 13/53 (2013.01); H01R 13/625 (2013.01); H01R 13/633 (2013.01); H01R 13/639 (2013.01)

(58) Field of Classification Search
CPC ............ H01R 13/6272; H01R 13/5219; H01R 13/53; H01R 13/625

USPC ........................................................ 439/345
See application file for complete search history.

(56) References Cited

U.S. PATENT DOCUMENTS 2,690,542 A * 9/1954 Pearce ............... H01R 13/2421
439/289
3,569,908 A * 3/1971 Appleton ............. H01R 13/707
439/136
3,719,918 A * 3/1973 Kerr ..................... H01R 13/746
439/319

(Continued)

FOREIGN PATENT DOCUMENTS

EP 0644622 A2 4/1994
TW M245644 U 10/2004
TW M461168 U 9/2013

Primary Examiner — Alexander Gilman
(74) Attorney, Agent, or Firm — Kirton McConkie; Evan R. Witt

(57) ABSTRACT

A power adapter assembly includes a first adapter and a second adapter. The first adapter comprises a first housing, pluralities of first electrical terminals and first signal terminals. The second adapter comprises a second housing, pluralities of second electrical terminals and second signal terminals. When the first adapter and the second adapter match with each other, a first latching element is axially coupled with the second latching element to a first position, wherein the two electrical terminals are coupled with each other. When an external force is provided, the first housing is radial with respect to the second housing, and rotates with each other until the two latching elements move to a second position to be securely fastened. The two signal terminals are coupled with each other to send an enabling signal to the control module, so as to enable the power transmission between the two electrical terminals.

14 Claims, 9 Drawing Sheets

(56) References Cited

U.S. PATENT DOCUMENTS

| | | | | |
|---|---|---|---|---|
| 4,857,008 | A * | 8/1989 | Kee | H01R 13/504 |
| | | | | 439/352 |
| 5,435,748 | A * | 7/1995 | Abe | H01R 13/641 |
| | | | | 439/188 |
| 5,505,632 | A * | 4/1996 | Hayashi | H01R 13/625 |
| | | | | 439/318 |
| 6,753,624 | B2 * | 6/2004 | Miwa | H01R 13/53 |
| | | | | 307/112 |
| 9,077,110 | B2 * | 7/2015 | Ohmura | H01R 13/6275 |
| 9,112,307 | B2 * | 8/2015 | Leroyer | H01R 13/6276 |
| 9,806,459 | B2 * | 10/2017 | Fuehrer | B60L 53/16 |
| 10,938,159 | B2 * | 3/2021 | Chagny | H01R 13/635 |
| 2004/0018764 | A1 * | 1/2004 | Thurston | H01R 13/623 |
| | | | | 439/312 |
| 2004/0192092 | A1 * | 9/2004 | Borrego Bel | H01R 13/53 |
| | | | | 439/181 |

* cited by examiner

ADAPTER ASSEMBLY

CROSS-REFERENCE TO RELATED APPLICATION

This application claims priority to China Patent Application No. 201911083272.1, filed on Nov. 7, 2019. The entire contents of the above-mentioned applications are incorporated herein by reference for all purposes.

FIELD OF THE INVENTION

The present disclosure relates to an adapter assembly, and more particularly to an adapter assembly with safety design to avoid electric arc result in carbon deposition, temperature rise too high, electrical shock issue and provide waterproof and dustproof functions.

BACKGROUND OF THE INVENTION

Electrical connector assembly or adapter assembly has been widely applied in various fields for conveying electric power from a power supplying end to a power receiving end. For example, an adapter assembly has been used for transferring electric power from a charging station or a utility power source to a battery mounted in an electric vehicle or a hybrid electric vehicle, and an electrical connector assembly including an industrial plug and a socket has been used for transferring power from a power source to an electrical equipment.

Trust in the safety and reliability of the electrical connector assembly or adapter assembly is very important for user. Namely, it is very import that the electrical connector assembly or the adapter assembly should not suffer from leakage of electricity. The electrical connector assembly or adapter assembly are often used outdoors, there is a great risk that some environmental substances such as water or dust may enter into the electrical connector assembly or adapter assembly. If the water or dust is introduced into the electrical connector or adapter, the user may suffer from an electrical shock at the moment that the electrical connector or adapter is connected with a matching electrical connector or adapter to transfer electric power and at the moment that the electrical connector or adapter is detached from a matching electrical connector or adapter to interrupt the power transmission.

For example, when an electric vehicle is charged from a charging station or a utility power source, the user has to use a charging adapter carefully. The charging adapter is often used outdoor. If water or dust is entered into the charging adapter, the user may suffer from an electrical shock at the moment that the charging adapter is connected with a matching adapter or connector to transfer electric power and at the moment that the charging adapter is detached from a matching adapter or connector to interrupt the power transmission. In order to prevent water and dust from being introduced into the charging adapter when the charging adapter is not in use, the charging adapter is equipped with a cap or lid for selectively covering or uncovering the electrical contacts thereof so as to protect against water and dust to a certain degree. However, these prior arts suffer from numerous disadvantages and inconvenience. The user does not have the habit of covering the cover or lid on the opening of the charging adapter when the charging adapter is not in use. Under this circumstance, the electrical contacts of the charging adapter are exposed to the environment which may cause the electrical contacts to corrode. In addition, the user may touch the electrical contacts of the charging adapter accidently and suffer from an electrical shock. Moreover, if the user forgets to cover the opening of the charging adapter and water or moisture is entered into the charging adapter, the user may suffer from an electrical shock at the moment that the charging adapter is connected with a matching adapter or connector to transfer electric power and at the moment that the charging adapter is detached from a matching adapter or connector to interrupt the power transmission. Moreover, the prior art also fails to provide a safety structure capable of preventing accident detachment between the charging adapter and a matching adapter or connector to address the electrical shock issue.

Usually, a large amount of electric power is conveyed during the electric vehicle charging and power transmission. Consequently, during the plug-in or plug-out process of the charging adapter, the electric power is directly conveyed instantly and at a large flow. Namely, a carbon deposition is easily generated at the electrical terminals due to the electric arc occur, and the temperature may rise too high, even an instant arcing may also occur. As accumulated over time, it may reduce the product life of the charging adapter, and it also may cause the safety problems in use.

Therefore, there is a need of providing an adapter assembly with safety design to obviate the drawbacks encountered from the prior arts.

SUMMARY OF THE INVENTION

It is an object of the present disclosure to provide an adapter assembly with safety design to avoid carbon deposition generated at the electrical terminals, temperature rise too high, electrical shock issue and provide waterproof and dustproof functions. The adapter assembly including a first adapter and a second adapter. The first adapter connects to a power supply, and the second adapter connects to a control module. When the first adapter and the second adapter are matched with each other, two corresponding latching element are axially coupled to a first position, so that first electrical terminals and second electrical terminals are coupled with each other but no power transmission provided for charging. When an external force is provided, the first adapter is radial with respect to the second adapter. The first housing and the second housing rotate with each other until the two latching elements are moved to a second position, so that the first adapter and the second adapter are securely fastened. Consequently, the first signal terminals are coupled with the second signal terminals, and an enabling signal is delivered to the control module, so as to enable the power transmission between the first electrical terminals and the second electrical terminals. Consequently, the problems of the carbon deposition generated at the electrical terminals and the temperature rise too high can be avoided, and the purpose of insulation and sealing protection is achieved. Moreover, due to corresponding design of the latching elements, it is labor-saving, time-saving and cost-saving to maintain the safety of utilizing the adapter assembly In accordance with an aspect of the present disclosure, there is provided an adapter assembly including a first adapter and a second adapter. The first adapter connects to a power supply. The first adapter comprises a first housing, a plurality of first electrical terminals and a plurality of first signal terminals. The first housing includes at least one first latching element. The second adapter connects to a control module. The second adapter comprises a second housing, a plurality of second electrical terminals and a plurality of second signal terminals. The second housing includes at least one second latching element. When the first adapter and the second adapter are matched with each other, the first housing sheathes on the second housing. The at least one first latching element is axially coupled with the at least one second latching element to a first position. The plurality of first electrical terminals and the plurality of second electrical terminals are coupled with each other but no power transmission provided for charging. When an external force is provided, the first housing is radial with respect to the second housing. The first housing and the second housing rotate with each other until the at least one first latching element and the at least one second latching element are moved to a second position. The first housing and the second housing are securely fastened. The plurality of first signal terminals are coupled with the plurality of second signal terminals. An enabling signal is delivered to the control module, so as to enable the power transmission between the plurality of first electrical terminals and the plurality of second electrical terminals.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
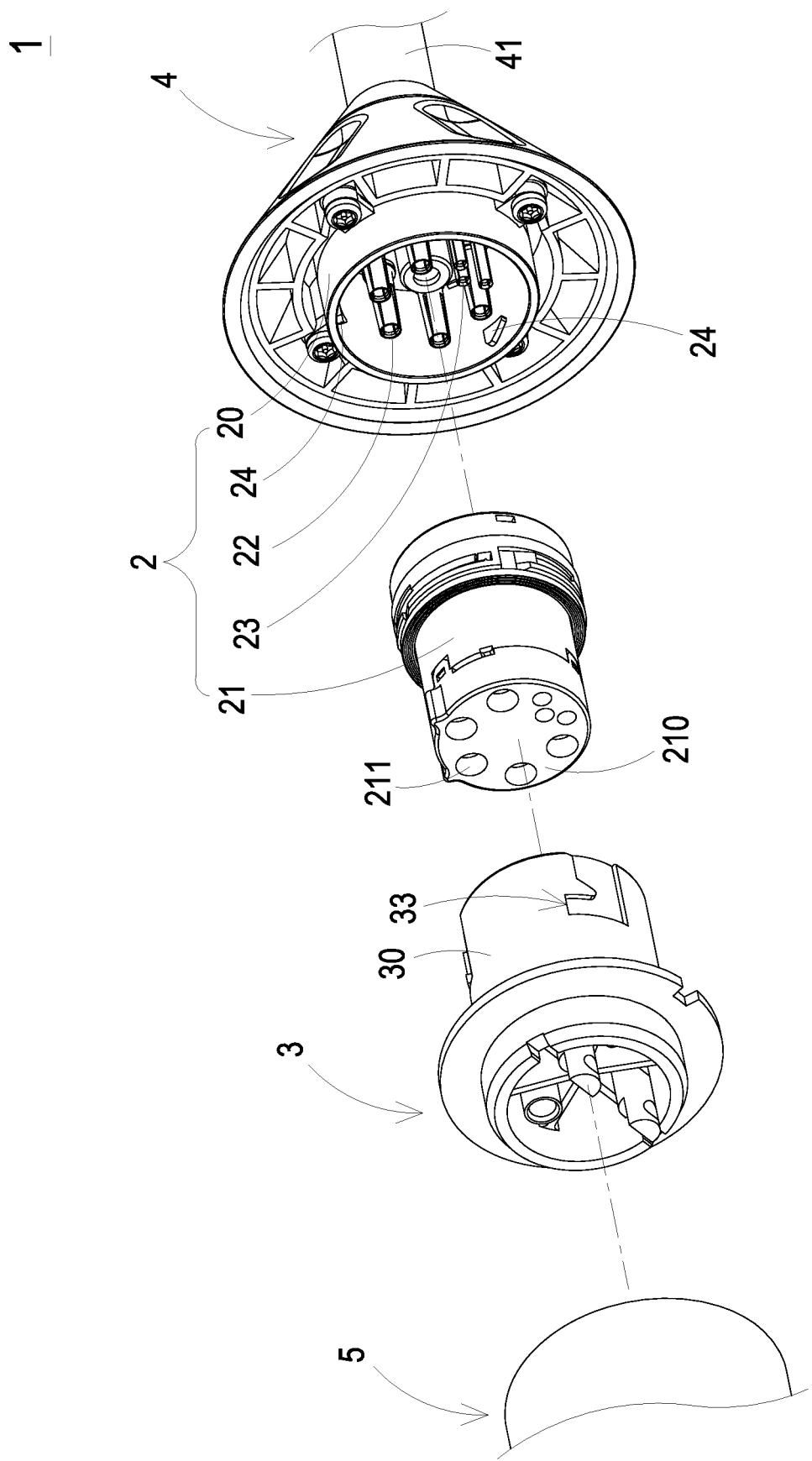
FIG. 1 is an exploded view illustrating an adapter assembly including a first adapter and a second adapter separated from each other according to a first embodiment of the present disclosure.
Figure 2:
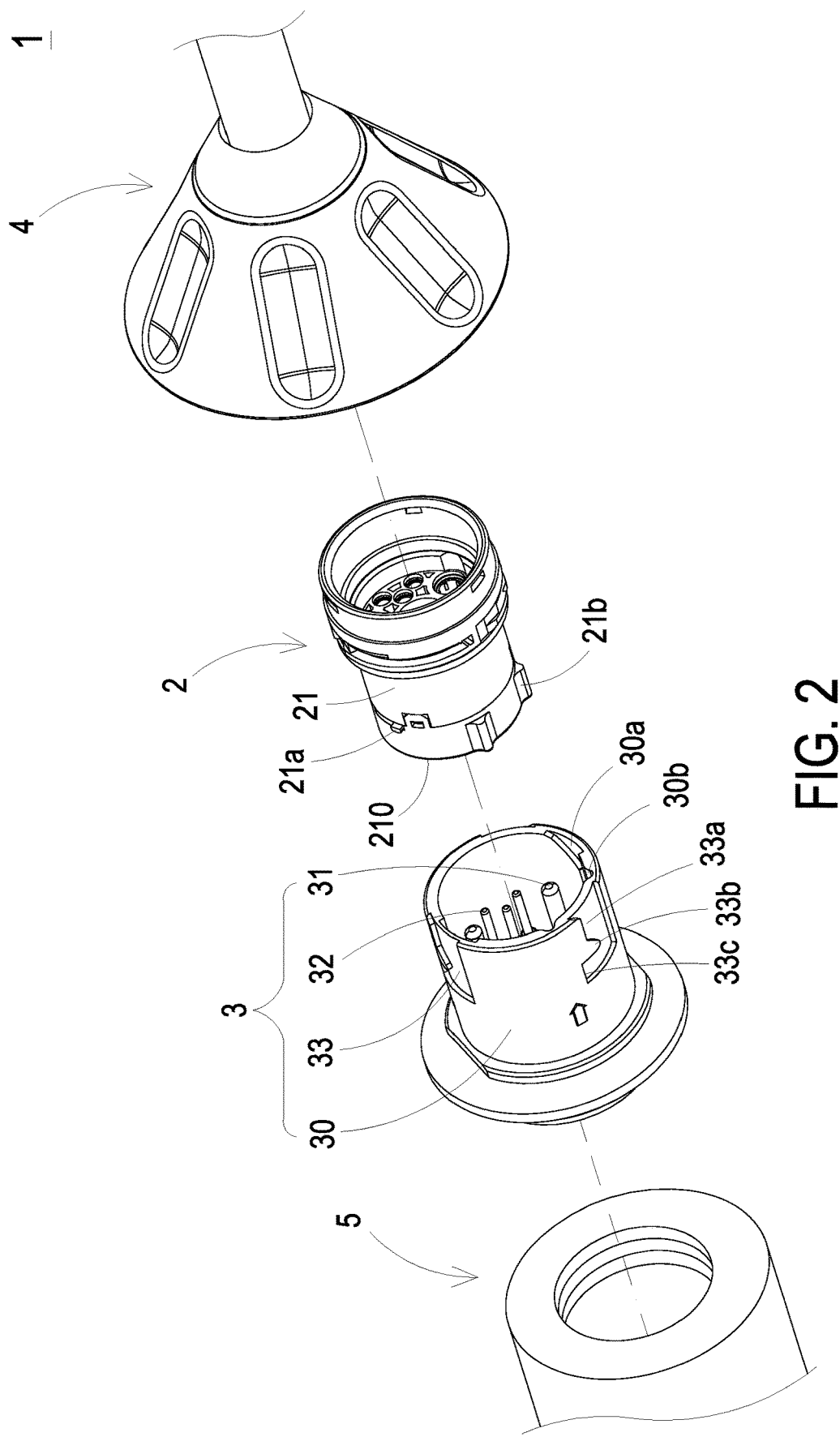
FIG. 2 is an exploded view illustrating the adapter assembly including the first adapter and the second adapter separated from each other according to the first embodiment of the present disclosure and taken at a different observation angle.
Figure 3:
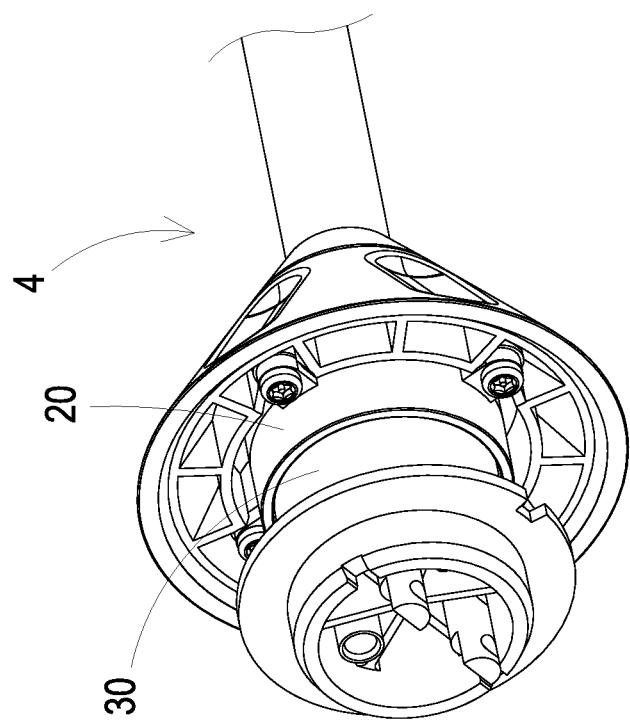
FIG. 3 is a schematic perspective view illustrating the adapter assembly of FIG. 1 after assembling.

FIGS. 1 and 2 are exploded views illustrating an adapter assembly including a first adapter and a second adapter separated from each other according to a first embodiment of the present disclosure. FIG. 3 is a schematic perspective view illustrating the adapter assembly of FIG. 1 after assembling. As shown in FIG. 1, the adapter assembly 1 includes a first adapter 2 and a second adapter 3. The first adapter 2 electrically couples with a power supply 4, and the second adapter 3 electrically couples with a control module 5. In some embodiments, the power supply 4 could be the mains or the industrial power supply. Namely, the adapter assembly 1 is applicable to various fields for conveying electric power from a power supplying end to a power receiving end. In an embodiment, the adapter assembly 1 including a first adapter 2 and a second adapter 3 can be used for transferring electric power from a charging station or a utility power source to a battery mounted in an electric vehicle or a hybrid electric vehicle. In some embodiments, the adapter assembly 1 including an industrial plug and a socket can be used for transferring power from a power source to an electrical equipment. It is noted that the adapter assembly 1 is not limited to the above embodiments and can be varied according to the practical requirements. More specifically, in the embodiment, the adapter assembly 1 electrically couples with the power supply 4 via a power cable 41, wherein the power cable 41 is exemplified and may be varied according to the practical requirements. The control module 5 is applicable to be utilized in vehicle system, but not limited thereto. The control module 5 includes a controller (not shown) for receiving enabling signals and delivering controlling signals correspondingly.

Please refer to FIG. 1, the first adapter 2 includes a first housing 20, an insulation housing 21, a plurality of first electrical terminals 22 and a plurality of first signal terminals 23, wherein the plurality of first electrical terminals 22 and the plurality of first signal terminals 23 are disposed within the first housing 20. In this embodiment, the length of the plurality of first electrical terminals 22 is larger than the length of the plurality of first signal terminals 23. The insulation housing 21 is a hollow cylindrical structure, and is used to be inserted in the first housing 20. The insulation housing 21 includes an insulation cover 210 for covering one side of the hollow cylindrical structure of the insulation housing 21. When the insulation housing 21 is correspondingly inserted in the first housing 20, the plurality of first electrical terminals 22 and the plurality of first signal terminals 23 are covered by the insulation cover 210 and to be protected within the insulation housing 21. Besides, the insulation cover 210 includes a plurality of through holes 211, which are disposed in correspondence with the plurality of first electrical terminals 22 and the plurality of first signal terminals 23. In some embodiments, the insulation cover 210 may be omitted by taking other insulation manners. Namely, the insulation cover 210 is exemplified and may be varied according to the practical requirements. In the embodiment, the first housing 20 further includes at least one first latching element 24. The first latching element 24 is disposed on an inner surface of the first housing 20, and the number of the first latching element 24 is 3, but not limited thereto, the arrangement and the number of the first latching element 24 may be varied according to the practical requirements. In other embodiments, the insulation housing 21 can be made of a polytetrafluoroethylene (also called as Teflon) material, but not limited thereto.

Please refer to FIG. 1 and FIG. 2. The second adapter 3 includes a second housing 30, a plurality of second electrical terminals 31 and a plurality of second signal terminals 32, wherein the plurality of second electrical terminals 31 and the plurality of second signal terminals 32 are disposed within the second housing 30. The length of the plurality of second electrical terminals 31 is larger than the length of the plurality of second signal terminals 32. In the embodiment, the second housing 30 further includes at least one second latching element 33. The second latching element 33 is disposed on an outer surface of the second housing 30, and the number of the second latching element 33 is 3, wherein the position and the number of the second latching element 33 is in correspondence with the first latching element 24. In some embodiments, the first adapter 2 and the second adapter 3 can be for example a female adapter and a male adapter, respectively, which are matched with each other.

Please refer to FIG. 2 again. In the embodiment, the insulation housing 21 comprises a plurality of protruding pins 21a and a plurality of positioning elements 21b. For example, the insulation housing 21 of the present disclosure comprises two protruding pins 21a opposite to each other and symmetrically disposed around and protruded from the outer edge thereof. Besides, the insulation housing 21 further includes two positioning elements 21b protruded from the outer edge thereof. The two positioning elements 21b may be but not limited to be triangle bulges. In correspondence with the protruding pins 21a and the positioning elements 21b, there are a plurality of guiding grooves 30a and a plurality of positioning grooves 30b disposed on the inner surface of the second housing 30, respectively. Consequently, there are two guiding grooves 30a opposite to each other and symmetrically disposed around the inner surface of the second housing 30. The guiding grooves 30a are spatially corresponding to the protruding pins 21a. Preferably but not exclusively, the protruding pin 21a and the guiding groove 30a are a protrusion and a recess, respectively. With the symmetrical arrangement of the protruding pin 21a and the guiding groove 30a, it facilitates the insulation housing 21 to move stably relative to the second housing 30. It is noted that the number and the arrangement of the protruding pin 21a and the guiding groove 30a are adjustable according to the practical requirements, and not redundantly described herein.

As shown in FIG. 2, the guiding groove 30a is a recess with a slope for guiding the protruding pin 21a. When the protruding pin 21a matches with the guiding groove 30a, it slides to a specification position along the slope. Consequently, the protruding pin 21a is fixedly disposed in the guiding groove 30a, and the insulation housing 21 can be fastened to the second housing 30 thereby. The shape and profile of the positioning groove 30b of the second housing 30 is in correspondence with the positioning element 21b. In this embodiment, the positioning groove 30b is triangle recesses for matching with the positioning element 21b. Consequently, when assembling the insulation housing 21 with the second housing 30, the purpose of rapid positioning could be achieved via the corresponding shapes and profiles of the positioning elements 21b and the positioning grooves 30b. In addition, the insulation housing 21 can be fixed to the second housing 30 due to the matching of the protruding pins 21a and the guiding grooves 30a.

In the embodiment, when the insulation housing 21 is inserted into the first housing 20, the insulation housing 21 is rotatable fastened to the first housing 20, but not limited to. In this circumstance, the plurality of first electrical terminals 22 and the plurality of first signal terminals 23 are covered and protected by the insulation housing 21. Consequently, the first adapter 2 can prevent electrical shock issue and provide waterproof and dustproof functions without using additional cover. Preferably but not exclusively, the structure of the first housing 20 and the insulation housing 21 are waterproof and dustproof and in complying with the IP 24 class of protection of the IEC/EN 60529 standard of the international Electrotechnical Commission.

After assembling the first housing 20 with the insulation housing 21 as the first adapter 2, the first adapter 2 is corresponding assembled with the second adapter 3. The assembling process is first to align the positioning element 21b of the insulation housing 21 to the positioning groove 30b of the second housing 30, and align the protruding pin 21a of the insulation housing 21 to the guiding groove 30a of the second housing 30. After that is to rotate the first adapter 2 with respect to the second adapter 3, wherein the insulation housing 21 can be fastened to the inside of the second housing 30, so as to complete the assembling structure of the adapter assembly 1 as shown in FIG. 3.

Figure 4A:
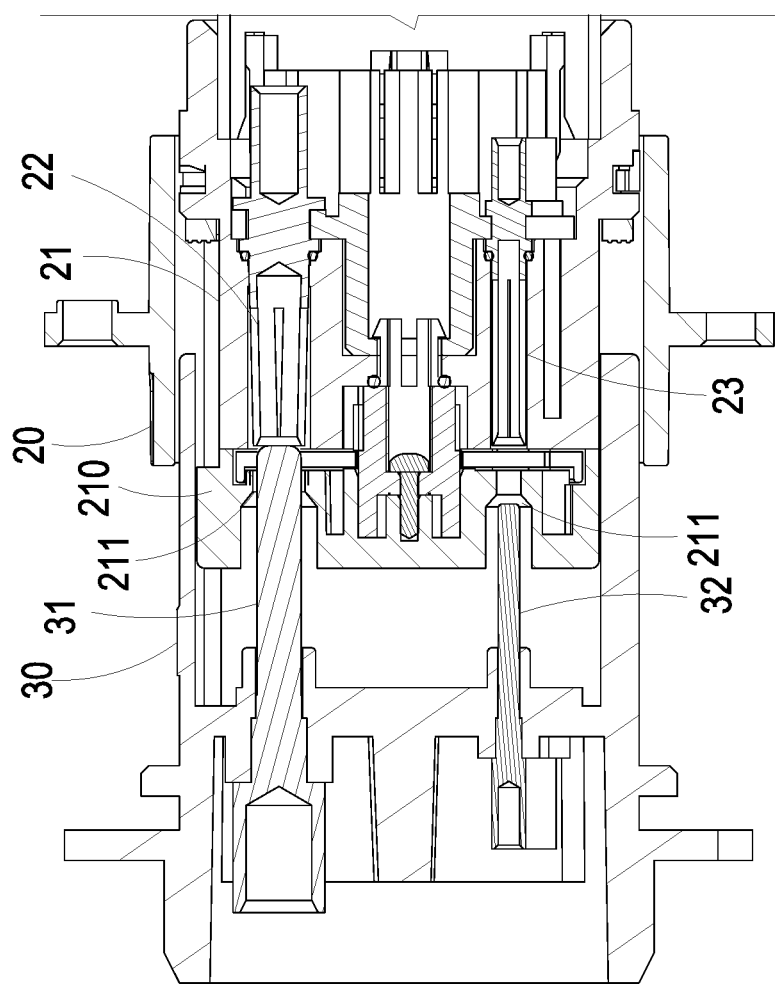
FIGS. 4A to 4C are exploded views showing the assembling process of the first adapter and the second adapter according to the first embodiment of the present disclosure.
Figure 4B:
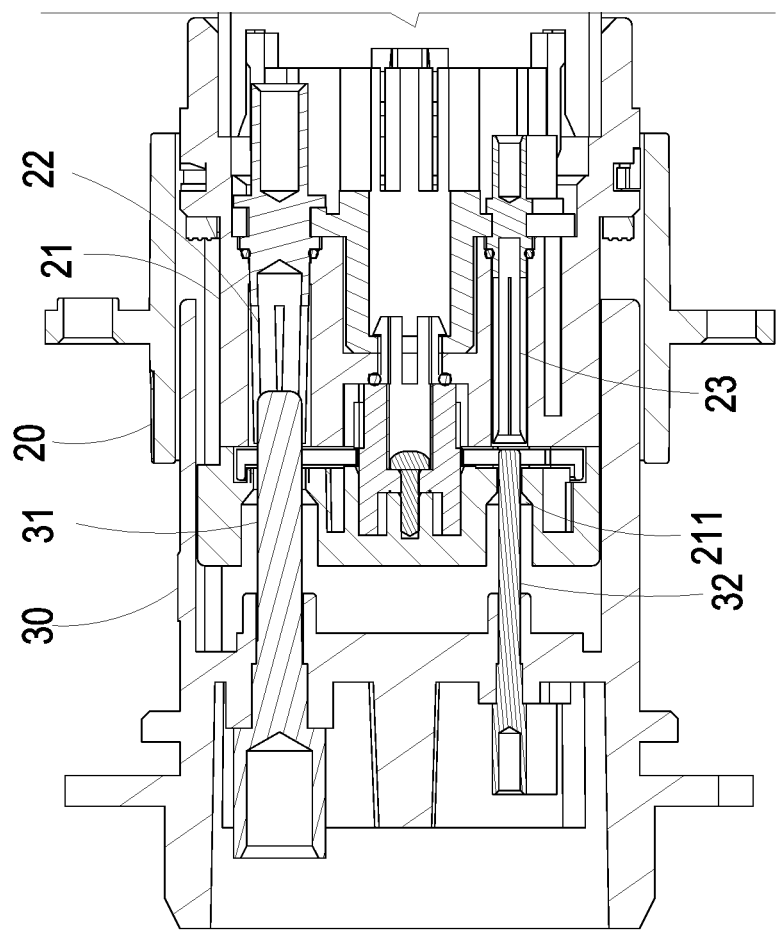
Figure 4C:
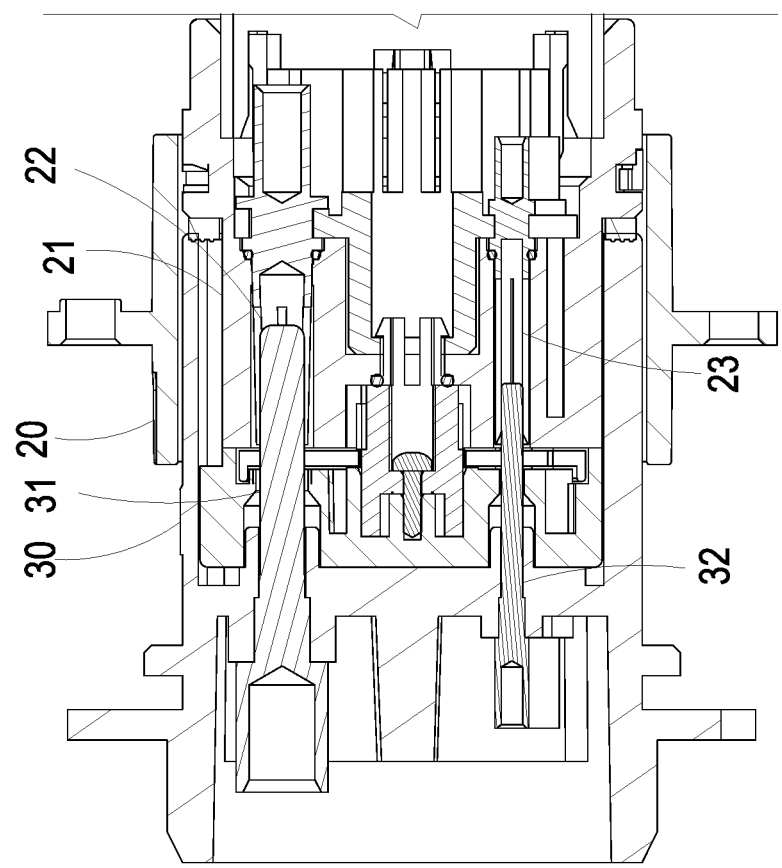
Figure 5A:
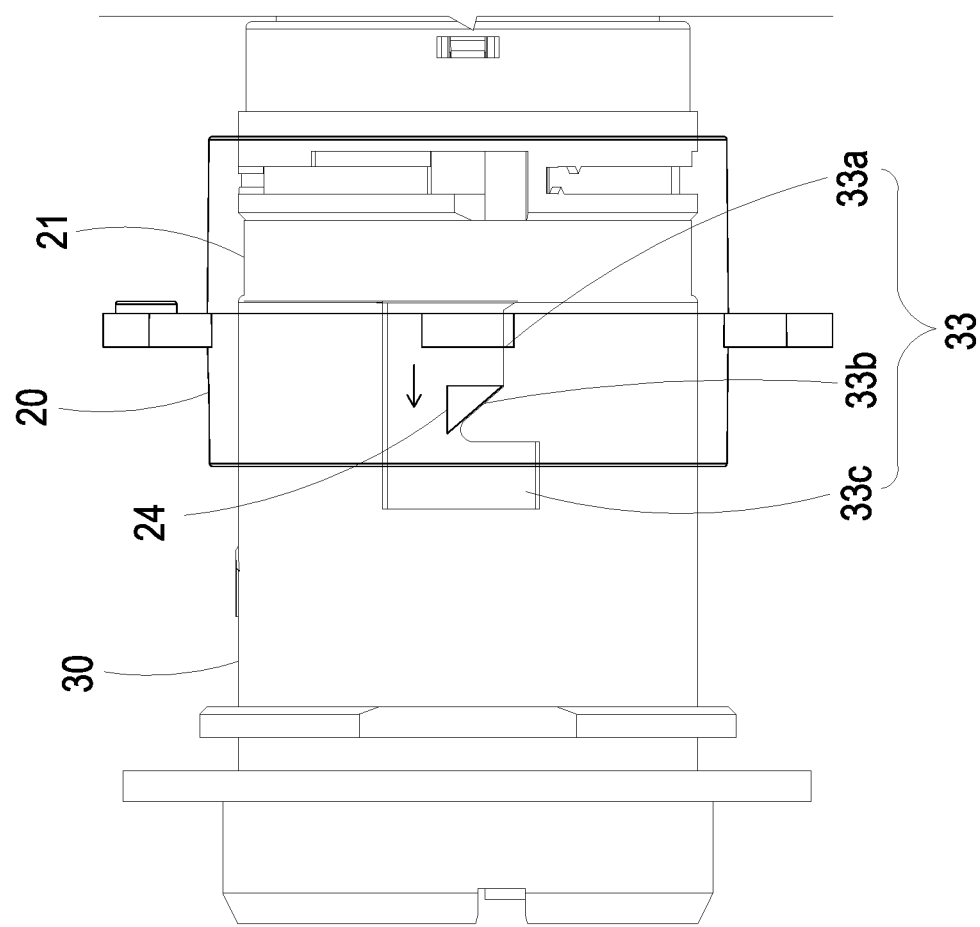
FIGS. 5A to 5C are schematic perspective views showing the assembling process of the first latching element of the first adapter and the second latching element the second adapter according to the first embodiment of the present disclosure.
Figure 5B:
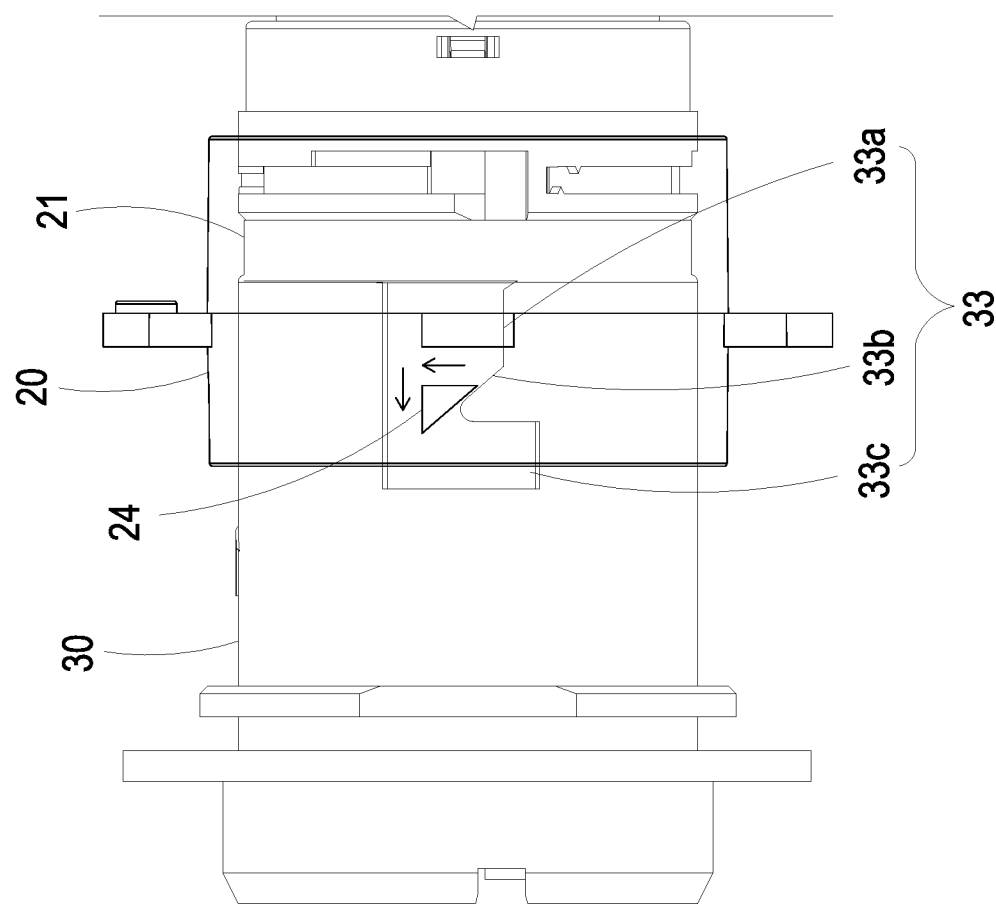
Figure 5C:
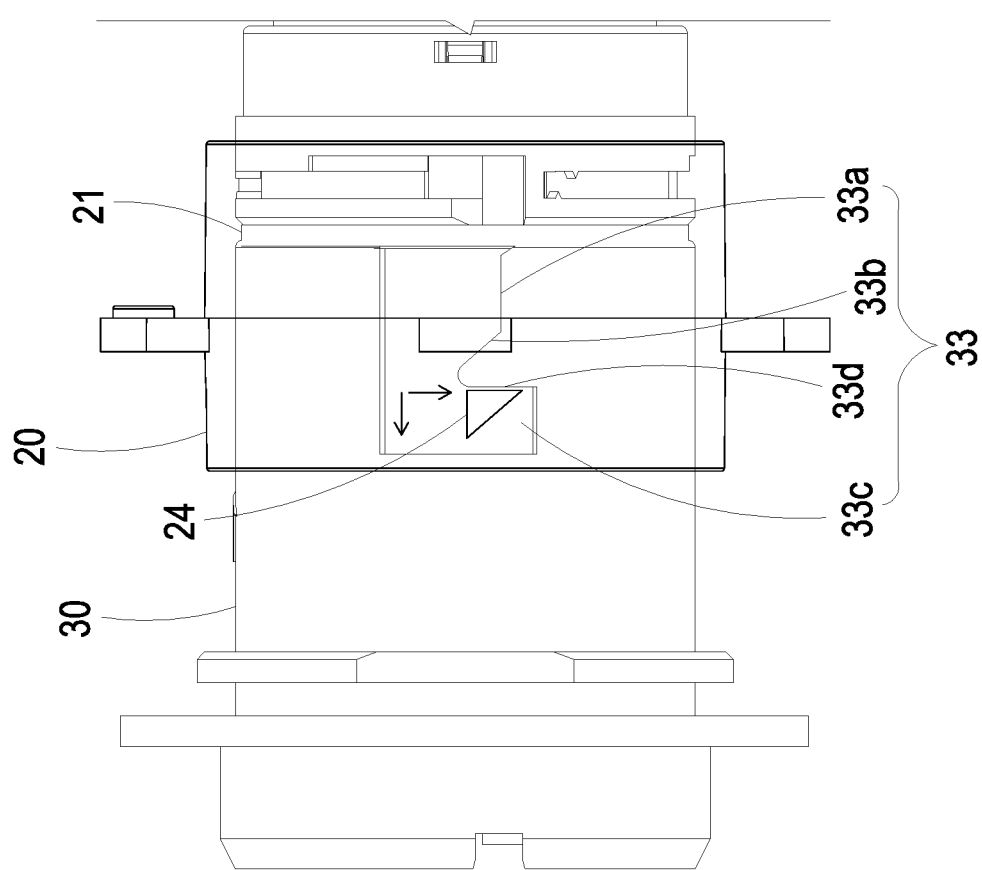

FIGS. 4A to 4C are exploded views showing the assembling process of the first adapter and the second adapter according to the first embodiment of the present disclosure. FIGS. 5A to 5C are schematic perspective views showing the assembling process of the first latching element of the first adapter and the second latching element the second adapter according to the first embodiment of the present disclosure. As shown in FIG. 4A, when the first adapter 2 assemblies with the second adapter 3, the first housing 20 sheathes on the second housing 30, and the insulation housing 21 is inserted within the second housing 30. In the embodiment, the insulation housing 21 is easily disposed into the second housing 30 due to the positioning of the positioning element 21b of the insulation housing 21 and the positioning groove 30b of the second housing 30. As mentioned above, the insulation housing 21 is fastened to the second housing 30 due to the matching of the protruding pin 21a of the insulation housing 21 and the guiding groove 30a of the second housing 30. Meanwhile, the first housing 20 correspondingly sheathes on the second housing 30 by the matching of the first latching element 24 disposed on the inner surface of the first housing 20 and the second latching element 33 of the second housing 30. As shown in FIG. 5A, in this embodiment, the first latching element 24 may be but not limited to be a triangle bulge, and the second latching element 33 may be an irregular groove structure. During assembling, the triangle bulge of the first latching element 24 first slides along the linear groove 33a of the second latching element 33 (as shown in the arrows of FIG. 5A) axially. When the triangle bulge of the first latching element 24 moves to the end of the linear groove 33a of the second latching element 33, it abuts to a slope 33b.

Please refer to FIG. 4A again. As shown in FIG. 4A, the plurality of second electrical terminals 31 of the second housing 30 run through the plurality of the through holes 211 of the insulation cover 210, and are in contact with the plurality of first electrical terminals 22 of the first housing 20. Meanwhile, the first latching element 24 and the second latching element 33 are disposed at first position. Although the plurality of second electrical terminals 31 is contacted to the plurality of first electrical terminals 22, there is no power transmission provided for charging at this moment. In the embodiment, the first electrical terminal 22 and the second electrical terminal 31 can be, for example, a female conductive terminal and a male conductive terminal, respectively, which are matched with each other, but is not limited thereto. Moreover, as shown in FIG. 4A, the length of the first signal terminals 23 and the second signal terminals 32 are respectively shorter than the first electrical terminals 22 and the second electrical terminals 31. Namely, when the first electrical terminals 22 and the second electrical terminals 31 contact with each other, the second signal terminals 32 still not penetrate the through holes 211 of the insulation housing 21. Consequently, the first signal terminals 23 fail to contact to the second signal terminals 32. In the embodiment, the first signal terminal 23 and the second signal terminal 32 can be but not limited to be a female conductive terminal and a male conductive terminal, respectively.

Please refer to FIG. 4B, FIG. 5A and FIG. 5B. As shown in FIG. 5A, when the triangle bulge of the first latching element 24 abuts the slope 33b of the second latching element 33, the first latching element 24 and the second latching element 33 are disposed at the first position. At this time, if an external force is provided to the first housing 20 by user, the first housing 20 and the second housing 30 are keeping in connection with each other in the radial direction. Namely, the first housing 20 is radial with respect to the second housing 30, and rotates with each other. As shown in FIG. 5A, the triangle bulge of the first latching element 24 slides along the slope 33b of the second latching element 33 until the top of the slope 33b. In the meantime, the first housing 20 rotates with respect to the second housing 30 due to the guiding by the slope 33b. As shown in FIGS. 4B and 5B, when the first latching element 24 slides to the top of the slope 33b of the second latching element 33, the first electrical terminals 22 and the second electrical terminals 31 are contacted with each other, but there is still no power transmission provided for charging. Also, as shown in FIG. 4B, the second signal terminals 32 have already run through the through holes of the insulation housing 21, while still fail to contact to the first signal terminals 23.

Please refer to FIG. 4C and FIG. 5C. As shown in FIG. 5C, when the external force keeps on pushing, the triangle bulge of the first latching element 24 will cross the top of the slope 33b of the second latching element 33, and to be disposed within a fastening recess 33c. Namely, the first latching element 24 and the second latching element 33 are disposed at the second position. At this moment, the triangle bulge of the first latching element 24 abuts the vertical surface 33d of the second latching element 33, so as to be fastened in the fastening recess 33c to avoid movement. According to the latching means described above, the first housing 20 and the second housing 30 are securely fastened with each other. Meanwhile, as shown in FIG. 5C, during this assembling process, the first housing 20 moves both in the axis direction and in the radial direction with respect to the second housing 30. Also, as shown in FIG. 4C, the first signal terminals 23 of the first housing 20 are coupled with the second signal terminals 32 of the second housing 30, so that an enabling signal is delivered to the control module 5. When the controller of the control module 5 receives the enabling signal, a controlling signal is delivered to the adapter assembly 1, and the power transmission is enabled by the first electrical terminals 22 and the second electrical terminals 31, so as to provide power for charging. According to the safety design of the present disclosure, when the first housing 20 is not completely connected to the second housing, more specifically, if the first latching element 24 and the second latching element 33 are not disposed at the second position, there will be no power transmission provided for charging between the first adapter 2 and the second adapter 3. Consequently, the drawbacks of the carbon deposition generated at the electrical terminals, the temperature rise too high and the instant arcing result from the instant over large current can be avoid due to the safety design. Consequently, the product life of the adapter assembly 1 is enlarged, and the electrical shock manner is also avoided. In addition, since the corresponding design of the first latching element 24 and the second latching element 33 are easily to move and fasten with each other, it is labor-saving, time-saving and cost-saving to maintain the safety of utilizing the adapter assembly 1.

From the above descriptions, the present disclosure provides an adapter assembly including a first adapter and a second adapter. The first adapter includes a first housing, a plurality of first electrical terminals and a plurality of first signal terminals, and the length of the first electrical terminals is larger than the first signal terminals. The second adapter includes a second housing, a plurality of second electrical terminals and a plurality of second signal terminals, and the length of the second electrical terminals is larger than the second signal terminals. When the first adapter and the second adapter are matched with each other, the first housing sheathes on the second housing. The first latching element of the first housing is axially coupled with the second latching element of the second housing to a first position, and the plurality of first electrical terminals and the plurality of second electrical terminals are coupled with each other but no power transmission provided for charging. When an external force is provided, the first housing is radial with respect to the second housing. The first housing and the second housing rotate with each other until the first latching element and the second latching element are moved to a second position, so that the first housing and the second housing are securely fastened. Consequently, the plurality of first signal terminals are coupled with the plurality of second signal terminals, and an enabling signal is delivered to the control module, so as to enable the power transmission between the plurality of first electrical terminals and the plurality of second electrical terminals. Namely, it is to make sure of the securely fastening of the first adapter and the second adapter via the design of the present disclosure, and the enabling signal can be transmitted only during the connection between the first and the second signal terminals, so as to enable the power transmission between the first and the second electrical terminals. Consequently, the drawbacks of the carbon deposition generated at the electrical terminals, the temperature rise too high and the instant arcing result from the instant over large current can be avoid, so as to enlarge the product life of the adapter assembly. In addition, the adapter assembly with safety design can avoid electrical shock issue and provide waterproof and dustproof functions due to the protection of an insulation housing of the first housing. Since the corresponding design of the first and the second latching element are easily to move and fasten with each other, it is labor-saving, time-saving and cost-saving to maintain the safety of utilizing the adapter assembly.

While the disclosure has been described in terms of what is presently considered to be the most practical and preferred embodiments, it is to be understood that the disclosure needs not be limited to the disclosed embodiment.

What is claimed is:

1. An adapter assembly, comprising:
a first adapter connecting to a power supply and comprising a first housing, an insulation housing, a plurality of first electrical terminals and a plurality of first signal terminals, wherein the insulation housing is rotatable fastened on the first housing, the insulation housing comprises an insulation cover, the insulation housing comprises at least one protruding pin, and the first housing includes at least one first latching element; and
a second adapter connecting to a control module and comprising a second housing, a plurality of second electrical terminals and a plurality of second signal terminals, wherein the second housing includes at least one second latching element, and the second housing comprises at least one guiding groove, the at least one guiding groove is disposed on the inner surface of the second housing, and is in correspondence to the at least one protruding pin for guiding the at least one protruding pin to be securely disposed along the at least one guiding groove;

wherein when the first adapter and the second adapter are matched with each other, the first housing sheathes on the second housing, and the at least one first latching element is axially coupled with the at least one second latching element to a first position, wherein the plurality of first electrical terminals and the plurality of second electrical terminals are coupled with each other, when an external force is provided, the first housing is radial with respect to the second housing, and rotates with each other until the at least one first latching element and the at least one second latching element are moved to a second position, so that the first housing and the second housing are securely fastened, and the plurality of first signal terminals are coupled with the plurality of second signal terminals, wherein an enabling signal is delivered to the control module, so as to enable the power transmission between the plurality of first electrical terminals and the plurality of second electrical terminals.

2. The adapter assembly according to claim 1, wherein the length of the plurality of first electrical terminals is larger than the plurality of first signal terminals, and the length of the plurality of second electrical terminals is larger than the plurality of second signal terminals.

3. The adapter assembly according to claim 1, when the at least one first latching element and the at least one second latching element are disposed at the first position, the plurality of first electrical terminals and the plurality of second electrical terminals are coupled with each other, while there is no power transmission provided for charging.

4. The adapter assembly according to claim 1, wherein the first adapter and the second adapter are a female adapter and a male adapter, respectively.

5. The adapter assembly according to claim 1, wherein the at least one first latching element is disposed on an inner surface of the first housing, and the at least one first latching element is a triangle bulge.

6. The adapter assembly according to claim 5, wherein the at least one second latching element is disposed on an outer surface of the second housing, and the at least one second latching element is an irregular groove for matching with the at least one first latching element.

7. The adapter assembly according to claim 6, wherein when the at least one first latching element and the at least one second latching element are at the first position, the triangle bulge of the at least one first latching element abuts a slope of the at least one second latching element.

8. The adapter assembly according to claim 7, wherein when the at least one first latching element and the at least one second latching element are at the second position, the triangle bulge of the at least one first latching element crosses the slope of the at least one second latching element, and triangle bulge is then disposed in a fastening recess and abuts a vertical surface of the at least one first latching element.

9. The adapter assembly according to claim 1, wherein the insulation housing sheathes on the first housing to cover and protect the plurality of first electrical terminals and the plurality of first signal terminals.

10. The adapter assembly according to claim 1, wherein the insulation cover covers one side of the insulation housing, and insulation cover has a plurality of through holes disposed in correspondence to the plurality of first electrical terminals and the plurality of first signal terminals.

11. The adapter assembly according to claim 1, wherein the at least one protruding pin is disposed on an outer edge of the insulation cover and protruded outwardly from the outer edge of the insulation cover.

12. The adapter assembly according to claim 1, wherein insulation housing comprises at least one positioning element, the at least one positioning element is protruded from an outer edge of the insulation cover.

13. The adapter assembly according to claim 12, wherein the second housing comprises at least one positioning groove, the at least one positioning groove is disposed on the inner surface of the second housing, and is in correspondence to the at least one positioning element for positioning with the at least one positioning element.

14. The adapter assembly according to claim 1, wherein the first electrical terminal and the second electrical terminal are respectively a female conductive terminal and a male conductive terminal, and the first signal terminal and the second signal terminal are respectively a female conductive terminal and a male conductive terminal.

* * * * *